United States Patent
Boutros et al.

(10) Patent No.: US 8,724,454 B2
(45) Date of Patent: May 13, 2014

(54) SYSTEM AND METHOD FOR SUMMARIZING ALARM INDICATIONS IN A NETWORK ENVIRONMENT

(75) Inventors: Sami Boutros, San Ramon, CA (US); Nagi Reddy Jonnala, San Jose, CA (US); Muthurajah Sivabalan, Kanata (CA); George Swallow, Boston, MA (US); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 12/778,871

(22) Filed: May 12, 2010

(65) Prior Publication Data

US 2011/0280121 A1 Nov. 17, 2011

(51) Int. Cl.
G01R 31/08 (2006.01)

(52) U.S. Cl.
USPC .......................................... 370/221

(58) Field of Classification Search
None
See application file for complete search history.

(56) References Cited

U.S. PATENT DOCUMENTS

| | | | |
|---|---|---|---|
| 2002/0116669 | A1 | 8/2002 | Jain |
| 2003/0185223 | A1 | 10/2003 | Tate et al. |
| 2003/0229691 | A1 | 12/2003 | Ishimoto |
| 2004/0160895 | A1 | 8/2004 | Holmgren et al. |
| 2005/0249119 | A1* | 11/2005 | Elie-Dit-Cosaque et al. 370/236 |
| 2006/0031482 | A1 | 2/2006 | Mohan et al. |
| 2007/0064674 | A1* | 3/2007 | Dunbar et al. .............. 370/351 |
| 2007/0115837 | A1* | 5/2007 | Elie-Dit-Cosaque et al. 370/242 |
| 2008/0172497 | A1 | 7/2008 | Mohan et al. |
| 2008/0175234 | A1 | 7/2008 | Li |
| 2008/0240101 | A1 | 10/2008 | Shao et al. |
| 2008/0253381 | A1 | 10/2008 | Ward et al. |
| 2008/0285466 | A1 | 11/2008 | Salam et al. |
| 2009/0059799 | A1* | 3/2009 | Friskney et al. .......... 370/241.1 |
| 2009/0296568 | A1 | 12/2009 | Kitada |

(Continued)

FOREIGN PATENT DOCUMENTS

| | | |
|---|---|---|
| CN | 1633082 A | 6/2005 |
| CN | 101015157 | 8/2007 |
| EP | 2528275 | 11/2012 |

OTHER PUBLICATIONS

U.S. Appl. No. 12/703,466, filed Feb. 10, 2010, entitled "System and Method to Provide Aggregated Alarm Indication Signals," Inventor: Nagi Reddy Jonnala.

(Continued)

*Primary Examiner* — Chi Pham
*Assistant Examiner* — Kouroush Mohebbi
(74) *Attorney, Agent, or Firm* — Patent Capital Group

(57) ABSTRACT

An example method includes detecting a failure at a first network element, the failure is associated with a link between the first network element and a second network element. The method also includes generating a list of network elements to be notified based on the failure, the second network element is included on the list. The method further includes generating an alarm indication signal (AIS) message, the AIS message identifies a plurality of tunnels affected by the failure. The AIS message is communicated to the second network element. In more detailed embodiments, each link between the first network element and the second network element includes a globally unique link identifier, which includes an associated autonomous system number. The globally unique link identifier can represent a string to be associated with the plurality of tunnels, the globally unique link identifier includes a source address and a destination address.

20 Claims, 4 Drawing Sheets

(56) References Cited

U.S. PATENT DOCUMENTS

2009/0327797 A1  12/2009  Wei
2010/0002706 A1   1/2010  Tochio
2010/0177641 A1*  7/2010  Farkas et al. .................. 370/242
2010/0238791 A1   9/2010  Duncan et al.

OTHER PUBLICATIONS

U.S. Appl. No. 12/657,676, filed Jan. 25, 2010, entitled "Pseudowire Status Maintenance for Static Pseudowires," Inventors: Luca Martini et al.
U.S. Appl. No. 12/754,525, filed Apr. 5, 2010, entitled "System and Method for Providing Pseudowire Group Labels in a Network Environment," Inventors: Sudhir K. Rustogi et al.
Luyuan Fang and Ben Niven-Jenkins, "Security Framework for MPLS-TP," Network Working Group, Internet Draft, Jul. 6, 2009, 20 pages; http://tools.ietf.org/html/draft-fang-mpls-tp-security-framework-00.
"Catalyst 4500 Series Switch Cisco IOS Software Configuration Guide-Release 12.2(50)SG: Configuring Y.1731 (AIS and RDI), Chapter 54," © 1999-2008 Cisco Systems, Inc., 10 pages; http://www.cisco.com/en/US/docs/switches/lan/catalyst4500/12.2/50sg/configuration/guide/Y1731.html.
Luca Martini and George Swallow, "Pseudowire Status for Static Pseudowires," Internet Engineering Task Force, Internet Draft, Feb. 18, 2010, 12 pages, http://tools.ietf.org/pdf/draft-ietf-pwe3-static-pw-status-00.pdf.
Cisco Systems, Inc., "L2TPv3: Layer 2 Tunnel Protocol Version 3," © 2003, 86 pages; http://www.cisco.com/en/US/docs/ios/12_3t/12_3t2/feature/guide/gtl2tpv3.html#wp1042745.
Luca Martini et al., "Pseudowire Setup and Maintenance: Using the Label Distribution Protocol (LDP)," Network Working Group, RFC 4447, Apr. 2006, 33 pages; http://www.faqs.org/ftp/rfc/pdf/rfc4447.txt.pdf.
M. Lasserre, et al., "Virtual Private LAN Service (VPLS) Using Label Distribution Protocol (LDP) Signaling," Network Working Group, RFC 4762, Jan. 2007, 31 pages; http://www.faqs.org/ftp/rfc/pdf/rfc4762.txt.pdf.
Luca Martini and George Swallow, "Pseudowire Status for Static Pseudowires," Internet Engineering Task Force, Internet Draft, Oct. 24, 2009, 10 pages, http://tools.ietf.org/pdf/draft-martini-pwe3-static-pw-status-02.pdf.
Hing-Kam Lam, et al., "MPLS TP Network Management Requirements," Network Working Group, Internet Draft, Jun. 24, 2009, 25 pages; http://tools.ietf.org/pdf/draft-ietf-mpls-tp-nm-req-02.txt.
Luca Martini et al., "Signaling Root-Initiated Pointed-to-Multipoint Pseudowires Using LDP," Internet Engineering Task Force, Internet Draft, Oct. 24, 2009, 17 pages, http://tools.ietf.org/id/draft-martini-pwe3-p2mp-pw-01.txt.
A. Fulignoli, et al., "MPLS-TP OAM Alarm Suppression Tools," MPLS Working Group, Internet Draft, Jul. 9, 2009, 11 pages; http://tools.ietf.org/pdf/draft-fulignoli-mpls-tp-ais-lock-tool-01.pdf.
USPTO Jul. 24, 2012 Non-Final Office Action from U.S. Appl. No. 12/574,525.
USPTO Oct. 23, 2012 Response to Jul. 24, 2012 Non-Final Office Action from U.S. Appl. No. 12/574,525.
USPTO Nov. 8, 2012 Non-Final Office Action from U.S. Appl. No. 12/657,676.
USPTO Feb. 12, 2013 Response to Non-Final Office Action dated Nov. 11, 2012 from U.S. Appl. No. 12/657,676.
USPTO Feb. 4, 2013 Final Office Action from U.S. Appl. No. 12/574,525.
EPO-Aug. 11, 2011 Extended European Search Report and Written Opinion from European Application No. 11167544.3; 6 pages.
"ITU-T Y.1731 Series Y: Global Information Infrastructure, Internet Protocol Aspects and Next-Generation Networks; Internet protocol Aspects—Operation, Administration and Maintenance: OAM Functions and Mechanism for Ethernet Based Networks Y.1731," International Telecommunication Union, Telecommunication Standardization Sector of ITU, 200802, Sections 4, 6, 7 and 9, Feb. 2008.
USPTO Apr. 1, 2013 RCE Response to Final Office Action dated Feb. 4, 2013 from U.S. Appl. No. 12/574,525.
USPTO Sep. 13, 2012 Non-Final Office Action from U.S. Appl. No. 12/703,466.
USPTO Dec. 13, 2012 Response to Sep. 13, 2013 Non-Final Office Action from U.S. Appl. No. 12/703,466.
USPTO Apr. 2, 2013 Final Rejection from U.S. Appl. No. 12/703,466.

* cited by examiner

US 8,724,454 B2

SYSTEM AND METHOD FOR SUMMARIZING ALARM INDICATIONS IN A NETWORK ENVIRONMENT

TECHNICAL FIELD

This disclosure relates in general to the field of communications and, more particularly, to summarizing alarm indications in a network environment.

BACKGROUND

The field of communications has become increasingly important in today's society. Multiprotocol Label Switching (MPLS) is a mechanism in telecommunications networks that carries data from one network node to the next. Layer 2 services (such as Frame Relay, Asynchronous Transfer Mode, and Ethernet) can be emulated over an MPLS backbone by encapsulating the Layer 2 Protocol Data Units (PDUs). An alarm indication signal (AIS) is typically used to indicate a signal failure. An AIS can be used in many transport platforms, standards, and applications. For example, an AIS may suppress alarms that are on network nodes, which are not the root cause of a failure. In addition, the AIS may trigger protection switching, for instance, by switching a node to a protected network. In all such cases, optimal management of signaling presents a significant challenge to network operators, service providers, and device manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes detecting a failure at a first network element, the failure is associated with a link between the first network element and a second network element. The method also includes generating a list of network elements to be notified based on the failure, the second network element is included on the list. The method further includes generating an alarm indication signal (AIS) message, the AIS message identifies a plurality of tunnels affected by the failure. The AIS message is communicated to the second network element.

In more detailed embodiments, each link between the first network element and the second network element includes a globally unique link identifier, which includes an associated autonomous system number. The globally unique link identifier can represent a string to be associated with the plurality of tunnels, the globally unique link identifier includes a source address and a destination address. In more specific embodiments, the method can include executing a routing decision for at least some of the tunnels based on receiving the AIS message, where the routing decision includes switching a group of paths sharing a same state on the link.

Example Embodiments

Figure 1:
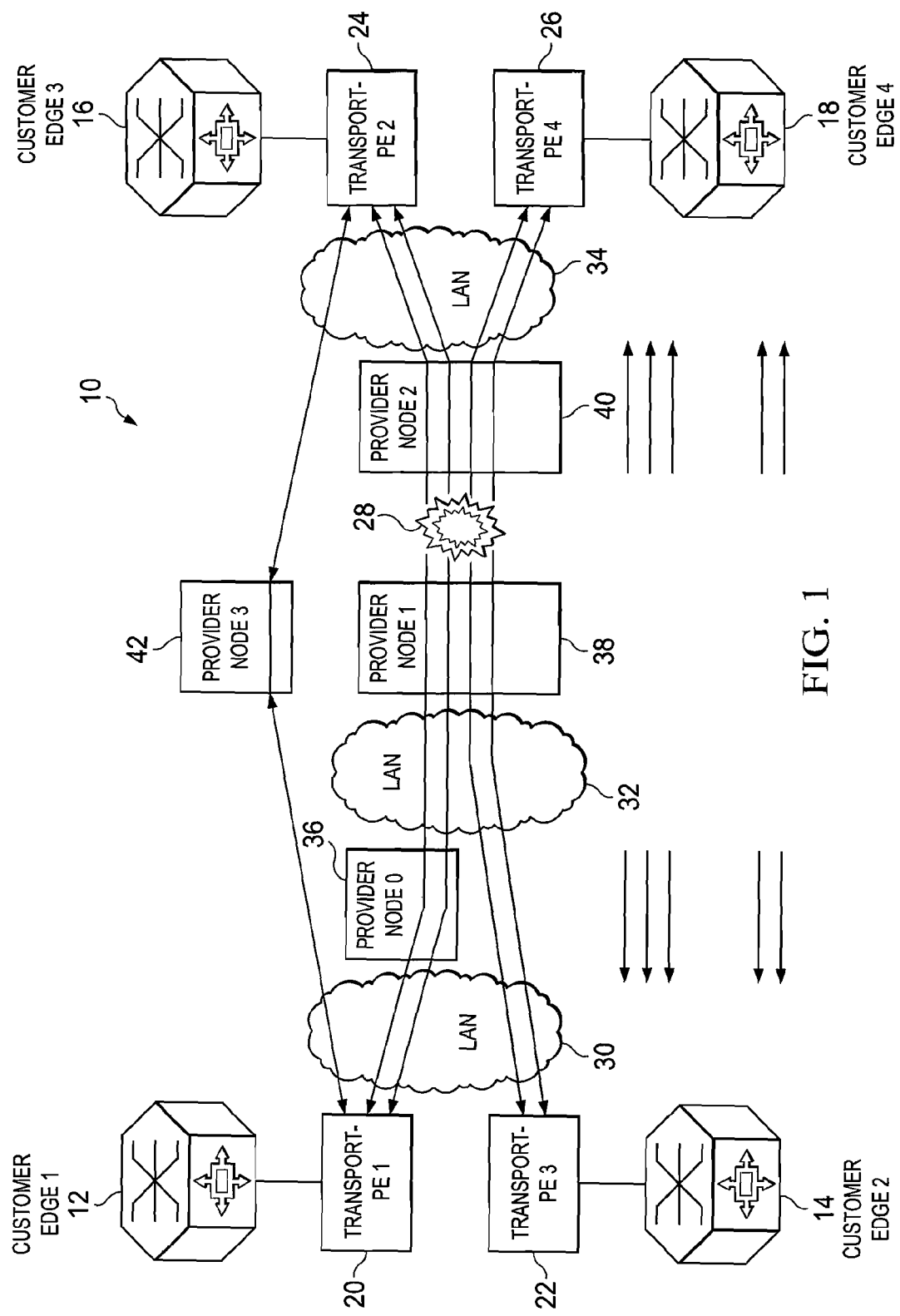
FIG. 1 is a simplified block diagram of a communication system for summarizing alarm indication signals in a network environment in accordance with one embodiment of the present disclosure.

FIG. 1 is a simplified block diagram of a communication system 10 for summarizing alarm indication signal (AIS) messages in a network environment. In a particular implementation, communication system 10 can be configured to summarize AIS messaging and, further, offer intelligent protection switching in multiprotocol label switching-transport profile (MPLS-TP) architectures. FIG. 1 includes multiple customer edges 12, 14, 16, and 18. Additionally, communication system 10 includes multiple transport provider edges 20, 22, 24, and 26. These transport provider edges are abbreviated as T-PE1, T-PE3, T-PE2, and T-PE4 respectively. [Note that the term 'terminating provider edge' is also encompassed by this T-PE terminology.] Additionally, FIG. 1 may also include switching provider edges (S-PEs) that can similarly exchange data in a network environment, where the S-PEs and the T-PE can be owned by different service providers, entities, etc. FIG. 1 also includes a number of provider nodes 36, 38, 40, and 42. The provider nodes are abbreviated P0, P1, P2, and P3 for purposes of certain discussions provided below. P1 and P2 can be considered as 'intermediate nodes' in regards to certain example flows described with reference to FIGS. 2 and 4. Additionally, FIG. 1 includes multiple local area networks (LANs) 30, 32, and 34, which can offer connectivity between various network nodes in communication system 10.

A number of failures 28 are also shown as propagating in the network. Typically, when a failure occurs in the network (e.g., a signal failure, an interface failure, a pulled cable, a switch failure, hardware/software failures generally, etc.), AIS messages are sent to various network devices in order to inform them of these failure conditions. Failures 28 of FIG. 1 are indicative of such conditions, where the underlying fault condition (being signaled by the AIS messages) can occur virtually anywhere in a network (e.g., in a customer edge, in provider edges, provider nodes, etc.).

In one particular arrangement, communication system 10 is provided in conjunction with a Layer-2 virtual private networks (L2VPN)/operation, administration, and maintenance (OAM) L2VPN/OAM framework. The OAM framework is intended to provide OAM layering across L2VPN services and packet switched network (PSN) tunnels. Communication system 10 may also include any suitable networking protocol or arrangement that provides a communicative platform for communication system 10. Thus, communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs.

Before detailing the infrastructure of FIG. 1, certain contextual information is provided to offer an overview of the problems encountered in AIS protocols. Such information is offered earnestly and for teaching purposes only and, therefore, should not be construed in any way to limit the broad applications for the present disclosure. In network environments, messages that signify failure conditions are commonly sent over a large number of links. Alarm indication signals (AISs) are commonly used for several different applications. For example, AIS messages can be used to suppress the alarms that are caused by a different root cause (e.g., a signal failure), where that root cause is being managed by critical alarms. In another instance, AIS messaging can be used to trigger protection switching. Other environments in which AIS messaging is appropriate include signaling a minor alarm to the network management system (NMS).

In many environments involving AIS messaging, it is assumed that there are hundreds of tunnels initiated by a T-PE. An intermediate node (especially the nodes that are closer to either a source or a destination such as provider node 38 or provider node 40) can detect a link failure and respond by generating an excessive amount of AIS messages to be sent to the T-PE nodes. Furthermore, as 40-gigabit and 100-gigabit technology evolves, the number of services (and therefore the number of tunnels) being affected by this messaging would significantly increase. MPLS-TP is likely to follow the current transport standards in generating an AIS per tunnel. However, this approach creates excessive overhead in AIS messaging, which could be avoided. One possible solution to mitigate this problem involves a stabilization interval. More specifically, after the first (or after the first few) AIS messages are communicated along a path (e.g., a tunnel), AIS generation may be reduced (i.e., cooled off) for a configurable time interval. However, this does not resolve the underlying signaling overhead problem.

Communication system 10 can address the aforementioned issues (and others) by offering an architecture configured to summarize AIS generation, which more directly resolves the signaling overhead. In one particular example implementation, instead of generating as many AIS messages as there are paths, a summarized AIS message (with all the paths that are affected from a particular destination) may be generated. In addition, communication system 10 can offer an intelligent protection switch mechanism, which triggers a switchover of a group of paths sharing the same fate (i.e., the same operational or failed state) on the same link. It should also be noted that a similar mechanism can be applied to a remote defect indication (RDI), if suitably supported in MPLS-TP.

In essence, communication system 10 summarizes multiple AISs into one message for each end node (e.g., T-PE/S-PE/maintenance endpoint (MEP)) and, further, offers an intelligent protection switching that is based on the link identifier (e.g., a link-ID) identified in those messages. A number of advantages can be achieved using such a protocol. For example, current AIS approaches require that, for a single link failure affecting a number of tunnels (e.g., involving 40 gigabit and 100 gigabit), thousands of tunnels could be affected, which would correspondingly trigger the generation of thousands of AIS messages. Reciprocally, each end node that is affected by the link failure would potentially receive thousands of AIS messages.

Instead of this burdensome overhead, intermediate nodes within communication system 10 generate only one summarized AIS message, which includes the tunnels that are affected on that end node, per end node. [The message can take any appropriate format and, further, be based on particular protocols or architecture needs.] it should also be noted that the processing load of the intermediate node is significantly reduced. Furthermore, a given end node does not have to receive a number of AISs for a single link failure. Instead, the end node receives one summarized AIS message that contains the tunnels that are affected. Moreover, in other architectures, the T-PE/S-PE/MEP would have to rely on a continuity check failure (or a per-tunnel AIS) to perform protection switching. In using the architecture of communication system 10, the T-PE/S-PE/MEP can understand that a link has failed in the network, and proactively apply the protection switching without waiting to receive (and process) tunnel level failures.

Firstly, and in regards to the internal structure associated with communication system 10, a certain pre-requisite can exist on the MEP/T-PE/S-PE and P/MIP nodes. Each link can be associated with a globally unique link-ID in the MPLS-TP network. According to one embodiment, the link identifier (e.g., link-ID) can contain an autonomous system number (AS #), Node-ID, local-link-ID, etc. In one particular example, the link-ID (representing a string that can be associated with a tunnel configuration) contains a source and a destination address.

During operations, each MEP/T-PE/S-PE can be configured to learn its MPLS-TP label switched path's (LSPs) association to the link-IDs in the MPLS-TP topology. An MEP can reside within each individual T-PE and, further, provide processing for incoming AIS messages. Using any suitable method (e.g., a path trace), the MEP/T-PE/S-PE can create a database of the links in the MPLS-TP topology that carries traffic for its MPLS-TP LSPs and, further, for the associated MPLS-TP LSPs.

Each provider/maintenance intermediate point (P/MIP) can be provisioned with the MPLS-TP LSPs association to its local link-IDs. Using the provisioned information, the P/MIP can create a topology database (or table) of links for the associated T-PE/S-PE/MEPs that source the MPLS-TP LSPs provided via its links. Additionally, for each source, a list of MPLS-TP LSPs is generated. The P/MIP can be provisioned in P0 and P2, where the topology database (or table) could be stored in any suitable memory element within P0 and P2. In operation, a P/MIP detecting the failure can forward one summarized AIS (e.g., in-band) to each source T-PE/MEP that has LSPs traversing the failed link. The message can contain the link-ID where the failure occurred, whereby the message can be encapped with the label stack of any LSPs originating from that source.

Secondly, the summarizing AIS can be formatted as follows. When a link failure (or any event that could cause an AIS message to be triggered) occurs on an intermediate node (e.g., P1, P2, etc.), the following activity can occur (in contrast to sending an AIS message on each affected tunnel). The intermediate node can prepare a list of end nodes (e.g., MEP/T-PE/S-PE) that need to be notified of the tunnel failures. [Note that as used herein in this Specification, the term 'list' merely connotes any type of record, inventory, file, or object that can identify a network object (e.g., a link, a node, a tunnel, etc.).] For each end node (e.g., MEP/T-PE/S-PE), the intermediate node can generate a list of tunnels. For each end node, the intermediate node can generate a summarized AIS message that contains the IDs of all tunnels that are affected by the link failure.

In addition, for each such summarization per link, the intermediate node can also add the link-ID. This information is useful for the MEP/T-PE/S-PE to apply intelligent protection switching. If the intermediate node is already generating a summarized AIS due to one or more link failures on that node, then the intermediate node may choose to append the new summarization for the recent link failure occurrence. In this scheme, the AIS message is being summarized for all link failures on the intermediate node, as opposed to one link failure.

When the end node receives the summarized AIS, the following activities can occur. First, when the end node (e.g., MEP/T-PE/S-PE) receives the summarized AIS, it can parse the message. Additionally, the end node can process the AIS failure against all the tunnels reported in the summarized AIS message (e.g., as if they are reported against each tunnel). The summarized AIS can be periodically sent as long as the defect(s) exists. In one particular example, the summarized AIS messages can be refreshed, as long as the failure exists.

In regards to addressing the summarized AIS message, if the IP forwarding/addressing is not supported in the MPLS-TP network, then the summarized AIS could be sent on any one of the MPLS-TP paths that are destined for the MEP/T-PE/S-PE. If no such path is available, then the intermediate node can revert to the conventional AIS message generation. If the IP forwarding/addressing is supported in the MPLS-TP network, then the summarized AIS could be sent to the MEP/T-PE/S-PE IP address.

In terms of the intelligent protection switching, the following activities can occur in accordance with example implementations of the present disclosure. When a T-PE/S-PE/MEP receives a summarized MPLS-TP AIS, it can identify tunnels/LSPs associated with the failed link-ID in the AIS message. Protection can subsequently be triggered, if such protection is available. Note that such protection does not need to be limited to tunnels, where such protection switching would be equally applicable to pseudowire protection (if available) when tunnel protection is not available.

Figure 2:
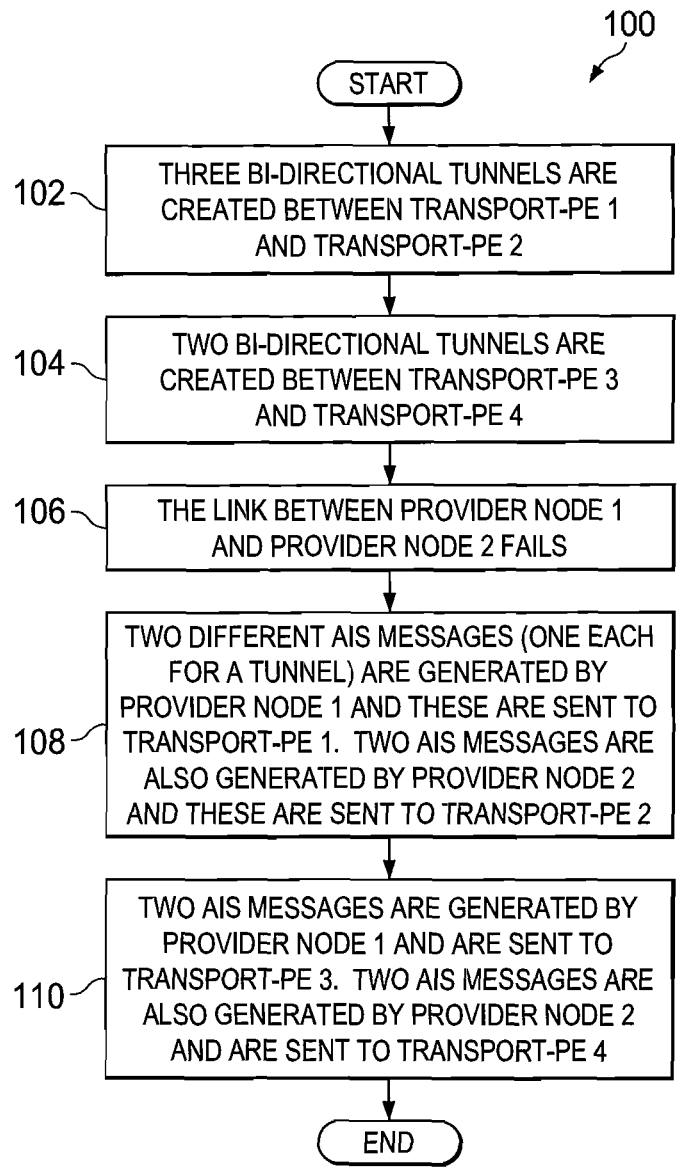
FIG. 2 is a simplified flowchart associated with an example operation of FIG. 1.

Turning to one set of operational details associated with FIG. 1, FIG. 2 is a simplified flowchart 100 illustrating one potential operation associated with the present disclosure. Note that the lines below P0 and P2 of FIG. 1 relate to the messaging semantics of FIG. 2. The discussion of FIG. 2 offers a generic overview of one activity associated with the present disclosure. The flow can begin at step 102, where three bi-directional tunnels are created between T-PE1 and T-PE2. At step 104, two bi-directional tunnels are created between T-PE3 and T-PE4. At step 106, the link between P1 and P2 fails. At step 108, two different AIS messages (one each, for a tunnel) are generated by P1, and these are sent to T-PE1. Two AIS messages are also generated by P2 and these are sent to T-PE2. At step 110, two AIS messages are generated by P1 and are sent to T-PE3. Two AIS messages are also generated by P2 and are sent to T-PE4. This signaling can be further simplified, where AIS messaging is reduced, as detailed below. Note that before turning to those example flows and additional example embodiments of the present disclosure, a brief overview of the infrastructure of communication system 10 is provided.

Customer edge 1 (CE1) 12, CE2 14, and CE3 16 represent devices, infrastructure, equipment, clients, or customers seeking to initiate a data session in communication system 10. These elements may can comprise a digital subscriber line access multiplexer (DSLAM), a router, a personal computer, a server, a switch, and/or other devices associated with data propagation. Further, these elements may sit behind, or in front of, one or more of these identified devices. The term 'CE' may be inclusive of the devices identified above (e.g., a DSLAM, a switch, etc.), as well as devices used to initiate a communication, such as a console, a proprietary endpoint, a telephone, a cellular telephone, a bridge, a computer, a personal digital assistant (PDA), a laptop or an electronic notebook, or any other device, component, element, or object capable of initiating voice, audio, media, or data exchanges within communication system 10. The customer element may also include any device that seeks to initiate a communication on behalf of another entity or element, such as a program, a database, or any other component, device, element, or object capable of initiating a voice, a video, text, or a data exchange within communication system 10. Data, as used herein in this document, refers to any type of video, numeric, voice, media, or script data, or any type of source or object code, or any other suitable information in any appropriate format that may be communicated from one point to another.

In one example, a service provider may provide various network services to a number of customers via CE1 12, CE2 14, and CE3 16. Such services may be associated with an Internet, an intranet, an extranet, a virtual private network (VPN), a virtual local area network (VLAN), etc. Each customer may use at least one customer edge device for transferring network traffic between the customer site and the network. In one example implementation, CE1 12, CE2 14, and CE3 16 can be routers at the customer premises that are connected to the provider edge of a service provider IP/MPLS network. CE1 12, CE2 14, and CE3 16 of FIG. 1 may be used in an Ethernet Layer 2 (L2) VPN, or in other L2-based network configurations, and thus, a customer edge device may be configured in order to coordinate Ethernet L2 service characteristics. L2 may respond to service requests from the network layer (Layer 3) and issue service requests to the physical layer (Layer 1). CE1 12, CE2 14, and CE3 16 may be used in other layers where appropriate and is not relegated to solely L2 activities. L2 may be used to transfer data between adjacent network nodes in a wide area network (WAN) or between nodes on the same local area network (LAN) segment. L2 may provide the functional and procedural mechanisms to transfer data between network entities and may provide detection and correction of errors that may occur in Layer 1. Examples of L2 protocols are Ethernet, point-to-point protocol (PPP), high-level data link control (HDLC), and advanced data communication control procedures (ADCCP) for point-to-point connections. Other standards or non-standard data transfer protocols may be used in conjunction with the architecture of FIG. 1.

CE devices may be configured after connection to a network, such as after a customer edge device has been connected and authorized by a provider edge device, which is part of a network. Upon receiving the Ethernet local management interface (E-LMI) protocol status query, a provider edge device may execute a suitable identification scheme. This allows identification of a particular CE device requesting configuration data to ensure the CE device is authorized to be part of the network. The provider element device may also execute an authentication/authorization application to authenticate and to authorize the presence of a CE device on the network. In one example, the provider edge device may authenticate and authorize a CE device based on an identification of the CE device such as a media access control (MAC) address, previously stored by the provider edge device during initial connection of the CE device. The authentication/authorization application may be implemented through various suitable protocols such as through a port-based protocol, through an IEEE 802.1X protocol, through Dynamic Host Configuration Protocol (DHCP), through PPPoE, through E-LMI with extensions, or through some other appropriate protocol or application.

Figure 3:
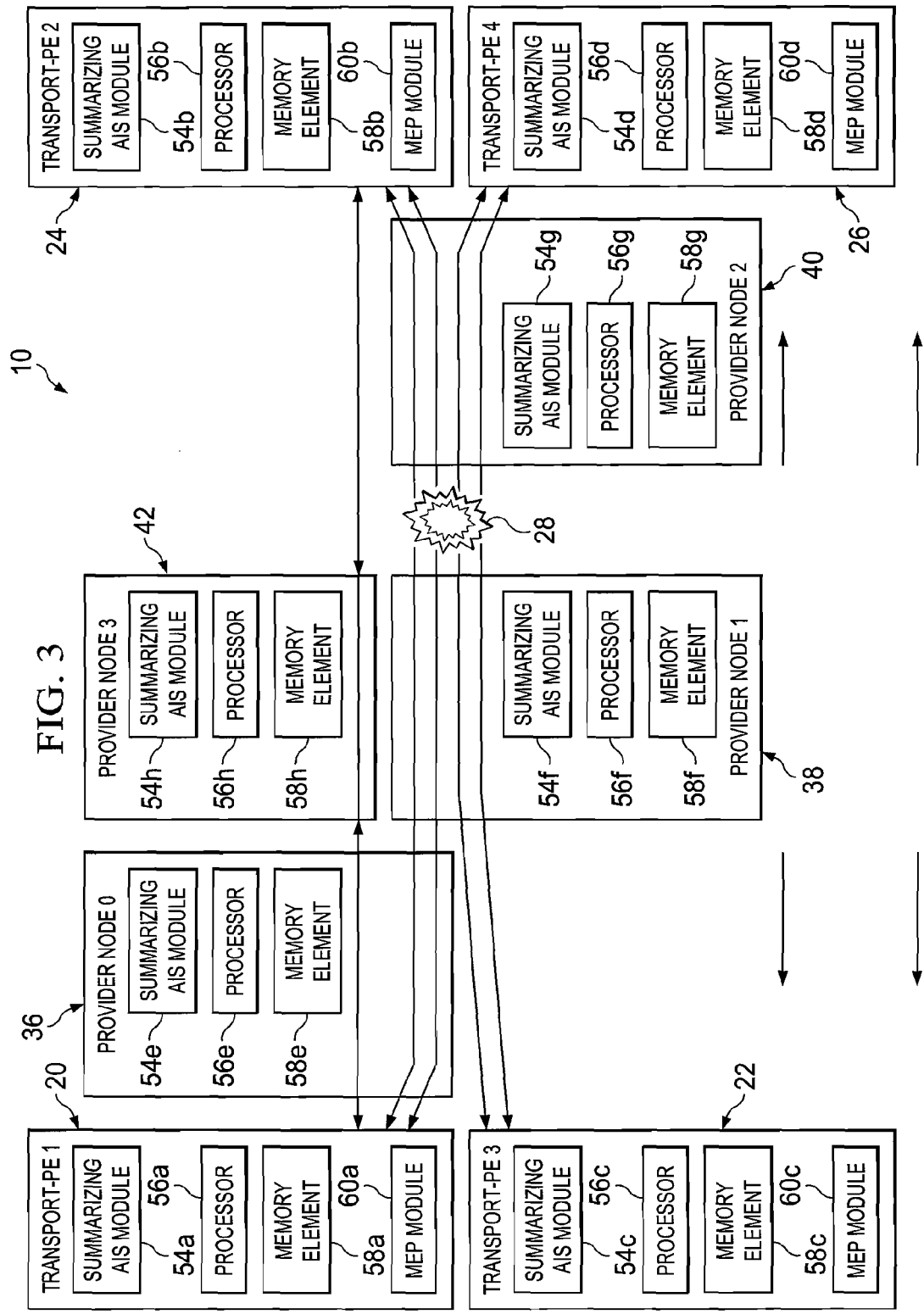
FIG. 3 is another simplified block diagram of a communication system for summarizing alarm indication signals in a network environment.

Certain components of FIGS. 1,3 may be coupled together (or exchange data) via LANs 30, 32, and 34. Alternatively, any type of packet switched network can be used for such exchanges, where the packet switched network represents a series of points or nodes of interconnected communication paths for receiving and transmitting packets of information that propagate through communication system 10. The packet switched network offers a communicative interface between network elements and may be any LAN, wireless LAN (WLAN), metropolitan area network (MAN), virtual LAN (VLAN), virtual private network (VPN), WAN, or any other appropriate architecture or system that facilitates communications in a network environment.

Turning to FIG. 3, FIG. 3 is a simplified block diagram illustrating one possible internal configuration associated with particular elements of communication system 10. In one particular example implementation, T-PE1, T-PE3, T-PE2, T-PE4, P0, P1, P2, and P3 each include a respective summarizing AIS module 54a-h, a respective processor 56a-h, and a respective memory element 58a-h. Additionally, T-PE1, T-PE3, T-PE2, and T-PE4 include a respective MEP module 60a-d.

T-PE1, T-PE3, T-PE2, T-PE4, P0, P1, P2, and P3 are network elements that facilitate communications in two directions in a network environment. In one particular example, each of these network elements is a switch configured to exchange data over networks links. Further, the traffic exchanged between these components may be directed over an MPLS transport in certain embodiments. As used herein in this Specification, the term 'network element' is meant to encompass switches, routers, bridges, gateways, servers, processors, loadbalancers, firewalls, or any other suitable device, component, element, or object operable to exchange or process information in a network environment. Moreover, these network elements may include any suitable hardware, software, components, modules, interfaces, or objects that facilitate the operations thereof. This may be inclusive of appropriate algorithms and communication protocols that allow for the effective exchange of data or information. Along similar design alternatives, any of the internal modules and components of these network elements may be combined in various possible configurations.

Software for achieving the summarizing and switching protocol discussed herein can be provided at various locations. In one example implementation, this software is resident in T-PE1, T-PE3, T-PE2, T-PE4, P0, P1, P2, and/or P3 (e.g., within AIS summarizing modules 54a-h respectively). In other examples, this could involve a proprietary element, which could be provided in (or be proximate to) these identified network elements, or be provided in any other device, or be provisioned somewhere else in the network. In other embodiments, the summarizing and switching protocol feature may be provided externally to T-PE1, T-PE3, T-PE2, T-PE4, P0, P1, P2, and/or P3, or included in some other network device, or a computer to achieve these intended functionalities. Alternatively, several elements (T-PE1, T-PE3, T-PE2, T-PE4, P0, P1, P2, and/or P3) can include appropriate software (or reciprocating software) that can coordinate in order to achieve the summarizing and switching protocols outlined herein. In still other embodiments, one, two, or more devices may include any suitable algorithms, hardware, software, components, modules, interfaces, or objects that facilitate the operations associated with summarizing and switching functions, as discussed herein.

Figure 4:
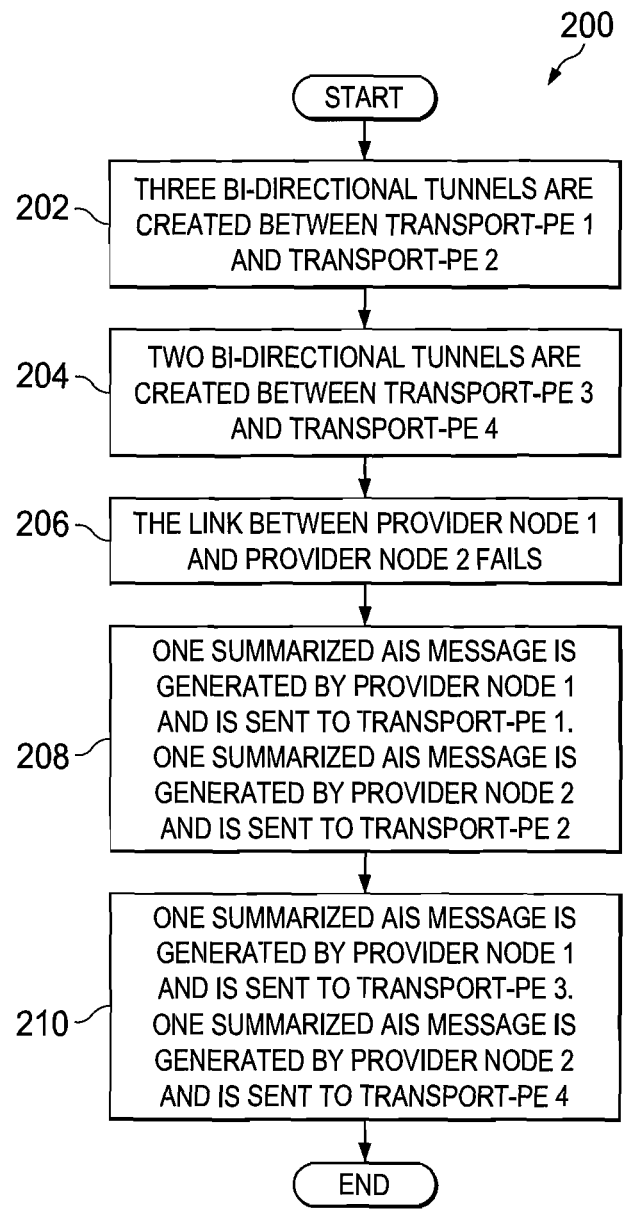
FIG. 4 is a simplified flowchart associated with an example operation of FIG. 3.

Turning to FIG. 4, FIG. 4 is a simplified flowchart 200 illustrating one potential operation associated with the present disclosure. Note that the lines below P0 and P2 of FIG. 3 relate to the messaging semantics of FIG. 4. The discussion of FIG. 4 offers a generic overview of one activity associated with the present disclosure. The flow begins at step 202, where three bi-directional tunnels are created between T-PE1 and T-PE2. At step 204, two bi-directional tunnels are created between T-PE3 and T-PE4. At step 206, the link between P1 and P2 fails. At step 208, one summarized AIS message is generated by P1, and this is sent to T-PE1. One summarized AIS message is generated by P2, and this is sent to T-PE2. At step 210, one summarized AIS message is generated by P1, and this is sent to T-PE3. One summarized AIS message is generated by P2, and this is sent to T-PE4.

In this scenario, the AIS signaling has been optimized. More specifically, a single AIS message has effectively been substituted for multiple messages that would otherwise be propagating in a network. A topology structure (e.g., a table, a database, etc.) stored in any of the network elements can be used to identify which network elements would receive a set of AIS messages. Those messages can effectively be summarized and sent a single time to each affected node (in contrast to sending specific AIS messages for each affected tunnel). In one general sense, an aggregation mechanism has been successfully used for AIS signaling to achieve better scaling properties. As a significant additional feature, the network elements can understand that a link has failed (e.g., via one of the aggregated AIS messages), where the network elements can begin rerouting (i.e., executing switching) for other tunnels that were also propagating through the failed link. This could occur without waiting for an AIS to come in for those tunnels.

In certain example implementations, the summarizing and switching functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory elements (as shown in FIG. 1) can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., T-PE1, T-PE3, T-PE2, T-PE4, P0, P1, P2, and/or P3) can include memory elements for storing information to be used in achieving the summarizing and switching operations as outlined herein. Additionally, each of these devices may include a processor that can execute software or an algorithm to perform the summarizing and switching activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
   detecting a failure at a first provider node, wherein the failure is associated with a link between the first provider node and a second provider node;
   generating a first alarm indication signal (AIS) message, wherein the first AIS message identifies a plurality of tunnels affected by the failure; and
   communicating the first AIS message from the first provider node to a first provider edge node, wherein the first provider edge node receives only one first AIS message for all tunnels affected by the failure.

2. The method of claim 1 further comprising:
   generating a second AIS message, wherein the second AIS message identifies a plurality of tunnels affected by the failure; and
   communicating the second AIS message from the second provider node to a second provider edge node, wherein the second provider edge node receives only one second AIS message for all tunnels affected by the failure.

3. The method of claim 1, wherein each link between the first provider node and the second provider node includes a globally unique link identifier that represents a string to be associated with the plurality of tunnels, and wherein the globally unique link identifier includes a source address and a destination address.

4. The method of claim 1, further comprising:
   executing a routing decision for at least some of the tunnels based on receiving the first AIS message, wherein the routing decision includes switching a group of paths sharing a same state on the link.

5. The method of claim 1, wherein if a new failure occurs, the first AIS message is appended with new summarization information associated with additional tunnels affected by the new failure.

6. The method of claim 1, wherein the first AIS message is parsed to identify tunnels or label switched paths affected by the failure.

7. The method of claim 1, wherein the first AIS message is refreshed such that it continues to be sent if the failure continues to exist.

8. Logic encoded in one or more non-transitory tangible media that includes code for execution and when executed by a processor operable to perform operations comprising:
   detecting a failure at a first provider node, wherein the failure is associated with a link between the first provider node and a second provider node;
   generating a first alarm indication signal (AIS) message, wherein the first AIS message identifies a plurality of tunnels affected by the failure; and
   communicating the first AIS message from the first provider node to a first provider edge node, wherein the first provider edge node receives only one first AIS message for all tunnels affected by the failure.

9. The logic of claim 8, the processor being further operable to perform operations comprising:
   generating a second AIS message, wherein the second AIS message identifies a plurality of tunnels affected by the failure; and
   communicating the second AIS message from the second provider node to a second provider edge node, wherein the second provider edge node receives only one second AIS message for all tunnels affected by the failure.

10. The logic of claim 8, wherein each link between the first provider node and the second provider node includes a globally unique link identifier that represents a string to be associated with the plurality of tunnels, and wherein the globally unique link identifier includes a source address and a destination address.

11. The logic of claim 8, the processor being further operable to perform operations comprising:
    executing a routing decision for at least some of the tunnels based on receiving the first AIS message, wherein the routing decision includes switching a group of paths sharing a same state on the link.

12. The logic of claim 8, wherein if a new failure occurs, the first AIS message is appended with new summarization information associated with additional tunnels affected by the new failure.

13. The logic of claim 8, wherein the first AIS message is parsed to identify tunnels or label switched paths affected by the failure.

14. An apparatus, comprising:
    a memory element configured to store data,
    a processor operable to execute instructions associated with the data, and
    an alarm indication signal (AIS) module configured to interface with the processor and the memory element in order to:
      detect a failure at a first provider node, wherein the failure is associated with a link between the first provider node and a second provider node;
      generate a first AIS message, wherein the first AIS message identifies a plurality of tunnels affected by the failure; and
      communicate the first AIS message from the first provider node to a first provider edge node, wherein the first provider edge node receives only one first AIS message for all tunnels affected by the failure.

15. The apparatus of claim 14, wherein the AIS module is further configured to interface with the processor and the memory element in order to:

generate a second AIS message, wherein the second AIS message identifies a plurality of tunnels affected by the failure; and communicate the second AIS message from the second provider node to a second provider edge node, wherein the second provider edge node receives only one second AIS message for all tunnels affected by the failure.

16. The apparatus of claim 14, wherein the AIS module is further configured to:

execute a routing decision for at least some of the tunnels based on receiving the first AIS message, wherein the routing decision includes switching a group of paths sharing a same state on the link.

17. The apparatus of claim 14, wherein each link between the first provider node and the second provider node includes a globally unique link identifier that represents a string to be associated with the plurality of tunnels, and wherein the globally unique link identifier includes a source address and a destination address.

18. The apparatus of claim 14, wherein if a new failure occurs, the first AIS message is appended with new summarization information associated with additional tunnels affected by the new failure.

19. The apparatus of claim 14, wherein the first AIS message is parsed to identify tunnels or label switched paths affected by the failure.

20. The apparatus of claim 14, wherein the first AIS message is refreshed such that it continues to be sent if the failure continues to exist.

\* \* \* \* \*